United States Patent [19]
Richardson

[11] Patent Number: 5,396,759
[45] Date of Patent: Mar. 14, 1995

[54] GAS TURBINE ENGINE COMBUSTOR

[75] Inventor: John S. Richardson, Derby, England

[73] Assignee: Rolls-Royce plc, London, England

[21] Appl. No.: 190,561

[22] Filed: Feb. 1, 1994

Related U.S. Application Data

[63] Continuation of Ser. No. 15,891, Feb. 10, 1993, abandoned, which is a continuation of Ser. No. 729,161, Jul. 12, 1991, abandoned.

[30] Foreign Application Priority Data

Aug. 16, 1990 [GB] United Kingdom ............... 9018014

[51] Int. Cl.6 ............................................. F23R 3/02
[52] U.S. Cl. ..................................... 60/39.36; 60/756
[58] Field of Search .................. 60/756, 755, 754, 752, 60/757, 39.36

[56] References Cited

U.S. PATENT DOCUMENTS

| | | | |
|---|---|---|---|
| 4,380,905 | 4/1983 | Smart et al. | 60/756 |
| 4,843,825 | 7/1989 | Clark | 60/756 |
| 4,934,145 | 6/1990 | Zeisser | 60/756 |
| 5,129,231 | 7/1992 | Becker et al. | 60/754 |

FOREIGN PATENT DOCUMENTS

| | | |
|---|---|---|
| 2635577 | 2/1990 | France . |
| 2637675 | 4/1990 | France . |
| 2044912 | 3/1979 | United Kingdom . |
| 2173891 | 3/1986 | United Kingdom . |
| 2204672 | 5/1987 | United Kingdom . |

*Primary Examiner*—Richard A. Bertsch
*Assistant Examiner*—William Wicker
*Attorney, Agent, or Firm*—Cushman, Darby & Cushman

[57] ABSTRACT

A gas turbine engine annular combustor having a bulkhead at its upstream end which is thermally protected by an annular array of heat shields. Each heat shield is provided with integral flanges which space apart the heat shields and bulkhead to define chambers therebetween. Apertures in the bulkhead direct cooling air into the chambers. Further apertures in the heat shields exhaust the cooling air in a common circumferential direction so that the air flows merge to define a substantially continuous annular flow of cooling air about the longitudinal axis of the combustor and across the downstream heat shield faces.

2 Claims, 6 Drawing Sheets

5,396,759

GAS TURBINE ENGINE COMBUSTOR

This is a continuation of Application No. 08/015,891, filed on Feb. 10, 1993, which was abandoned upon the filing hereof, which is a continuation of 07/729,161 filed Jul. 12, 1991, abandoned.

This invention relates to a gas turbine engine combustor and is particularly concerned with the thermal protection of the wall at the upstream end of an annular combustor.

Modern gas turbine engines are commonly provided with a combustor which is of generally annular configuration. Usually a wall or bulkhead is provided at the upstream end of the combustor which is suitably apertured to receive a number of fuel burners. The fuel burners are equally spaced around the bulkhead and direct fuel into the combustor to support combustion therein. The combustor bulkhead is therefore usually close to the high temperature combustion process taking place within the combustor making it vulnerable to heat damage.

One way of protecting the bulkhead from the direct effects of the combustion process is to position heat shields on its vulnerable parts. Typically each heat shield is associated with a corresponding fuel burner, extending both radially towards the radially inner and outer extents of the bulkhead and circumferentially to abut adjacent heat shields. Each heat shield is spaced apart from the bulkhead so that a narrow space is defined between them. Cooling air is directed into this space in order to provide cooling of the heat shield and so maintain the heat shield and the bulkhead at acceptably low temperatures.

In practice it has been found that certain parts of the heat shields have been difficult to cool effectively so that localised overheating occurs. This is a particular problem in the regions of the heat shields which abut adjacent heat shields.

It is an object of the present invention to provide a gas turbine engine annular combustor in which more effect cooling of such regions is achieved.

According to the present invention, a gas turbine engine annular combustor includes a bulkhead at its upstream end, said bulkhead having a plurality of fuel burner receiving apertures therein, and a plurality of heat shields located on its downstream face so as to provide thermal shielding thereof, said heat shields being arranged in an annular array so that circumferentially adjacent heat shields abut each other, means being provided to space apart each of said heat shields and said bulkhead so that corresponding chambers are defined therebetween, said bulkhead having a plurality of further apertures therein to direct cooling air into said chambers, each of said heat shields having a plurality of cooling air apertures therein which are adapted to exhaust cooling air from its associated chamber, at least some of said cooling air apertures being arranged to exhaust cooling air in a common, generally circumferential direction so that said cooling air flows from said at least some apertures merge to define at least one substantially continuous annular flow of cooling air about the longitudinal axis of said combustor and across the downstream faces of said heat shields.

The present invention will now be described by way of example, with reference to the accompanying drawings in which.

Figure 1:
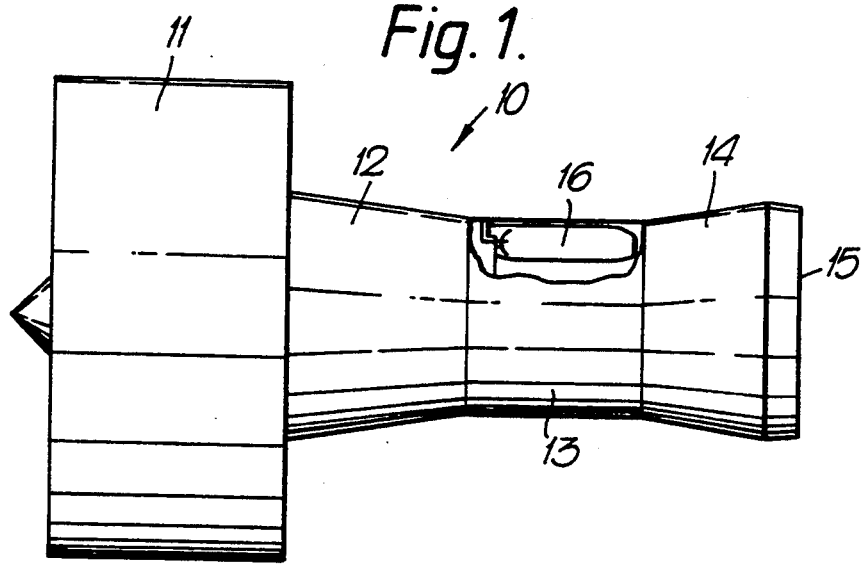
FIG. 1 is a side view of a portion of the upstream end of a combustor in accordance with the present invention.

Referring to FIG. 1, a ducted fan gas turbine engine generally indicated at 10 is of conventional construction in that it comprises, in axial flow series, a ducted fan 11, compressors 12, combustion equipment 13, turbines 14 and a propulsion nozzle 15. The engine 10 operates in the conventional way so that air compressed by the fan 11 and compressors 12 is mixed with fuel and the mixture combusted in the combustion equipment 13. The resultant combustion products then expand through the turbines 14, which drive the fan 11 and compressors 12, to be exhausted through the propulsion nozzle 15. Propulsive thrust is provided both by the propulsion nozzle 15 exhaust and by part of the air flow exhausted from the fan 11.

Figure 2:
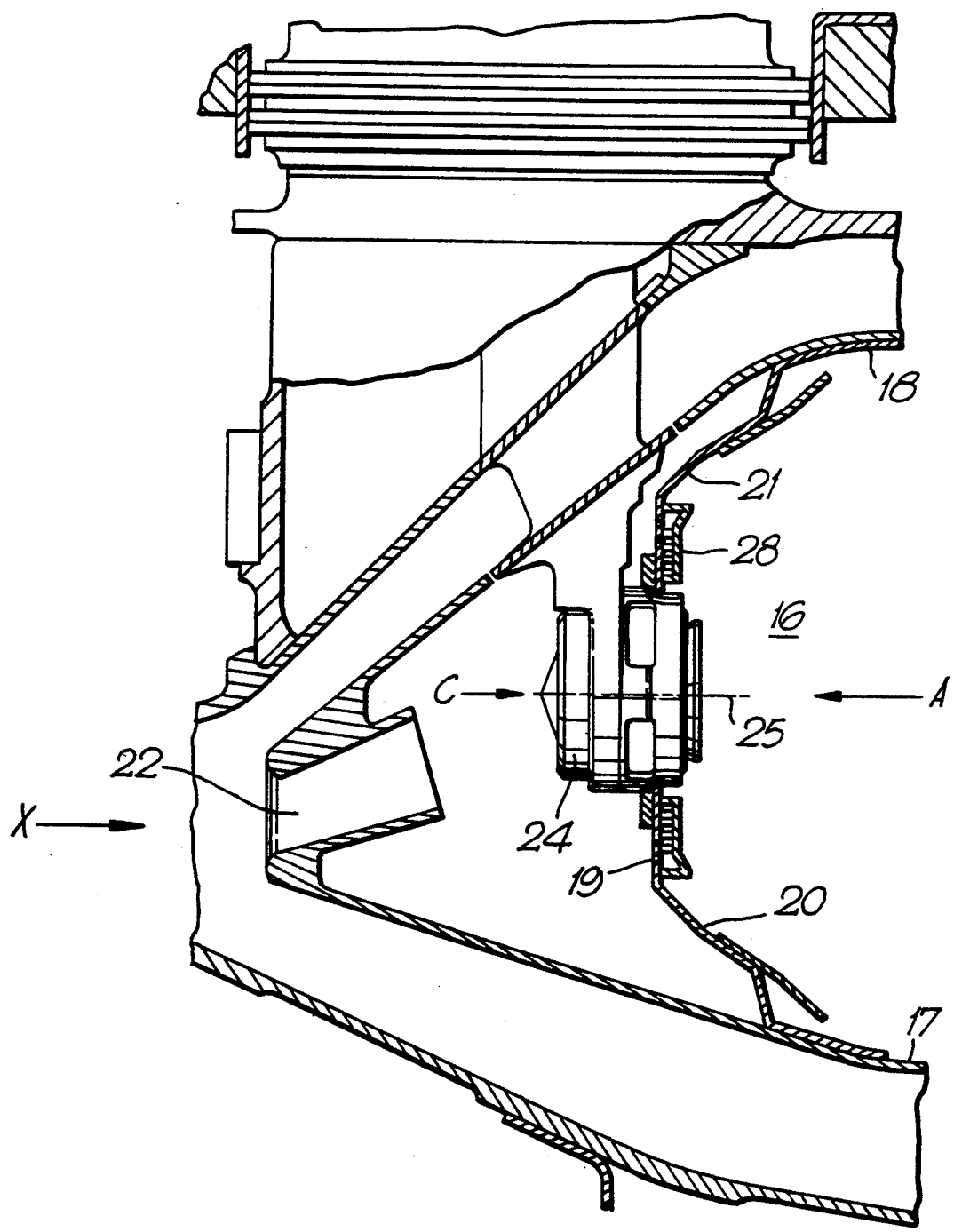
FIG. 2 is a sectioned side view of a portion of the upstream end of a combustor in accordance with the present invention showing one of the fuel burners of that combustor.

The combustion equipment 13 comprises an annular combustor 16, the upstream end of a portion of which can be seen more clearly if reference is now made to FIG. 2. The combustor 16 comprises radially inner and outer annular walls 17 and 18 respectively which are interconnected at their upstream ends by a bulkhead 19, the mid-portion of which is generally planar and radially extending. The radially inner and outer extents 20 and 21 respectively of the bulkhead 19 are configured so as to blend with the combustor walls 17 and 18. The combustor walls 17 and 18 extend upstream of the bulkhead 19 to define a plurality of air inlets 22. The air inlets 22 are fed with air from the compressors 12 flowing in the general direction indicated by the arrow X.

Figure 3:
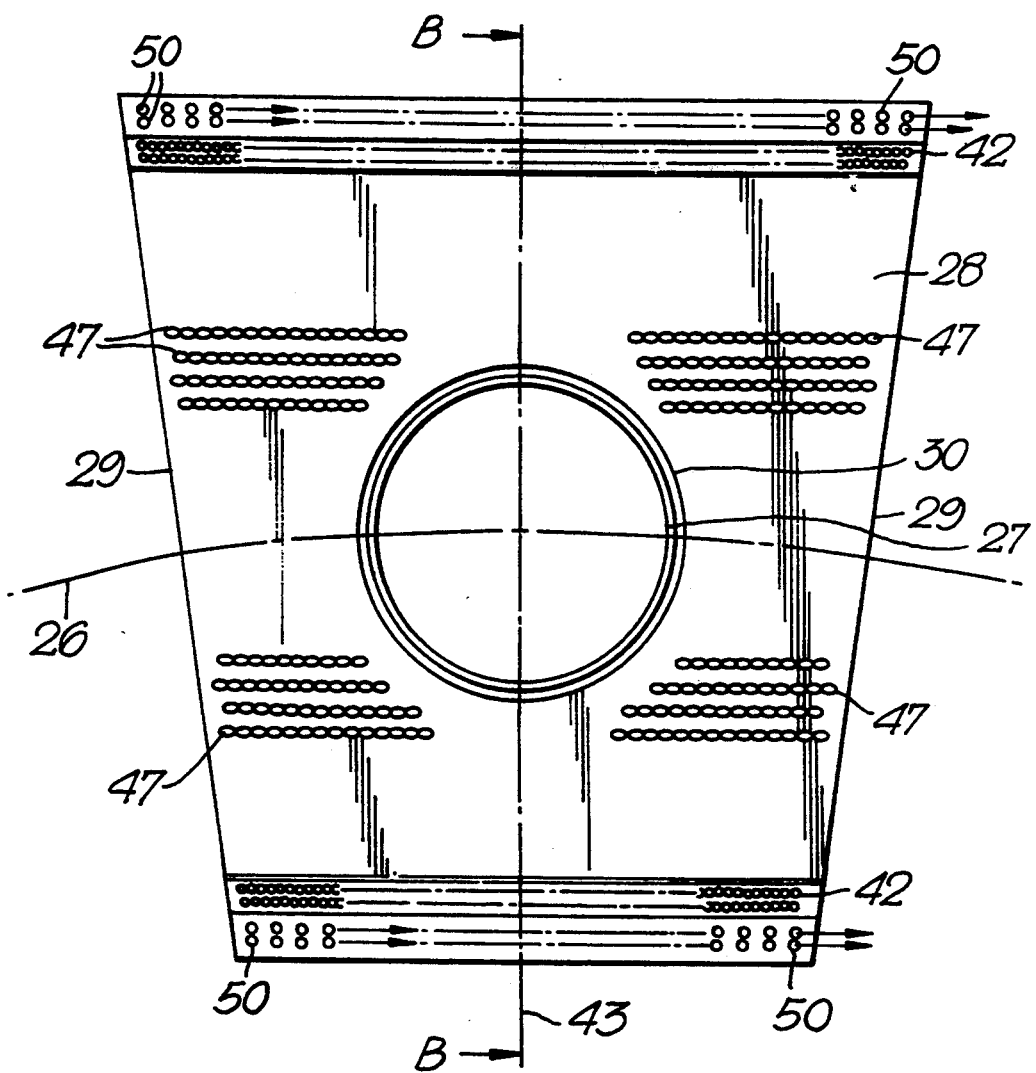
FIG. 3 is a view on arrow A of FIG. 2 of one of the heat shields of the combustor in accordance with the present invention, the fuel burner having been omitted in the interests of clarity.

A plurality of apertures 23 are provided in the bulkhead 19, each one to receive the outlet end of a fuel burner 24. The apertures 23 are equally spaced around the bulkhead 19 so that their longitudinal axes 25 constitute generators of a notional cylindrical surface 26. As can be seen in FIG. 3, the axis of the notional cylindrical surface 26 is coaxial with the longitudinal axis of the engine 10.

Figure 4:
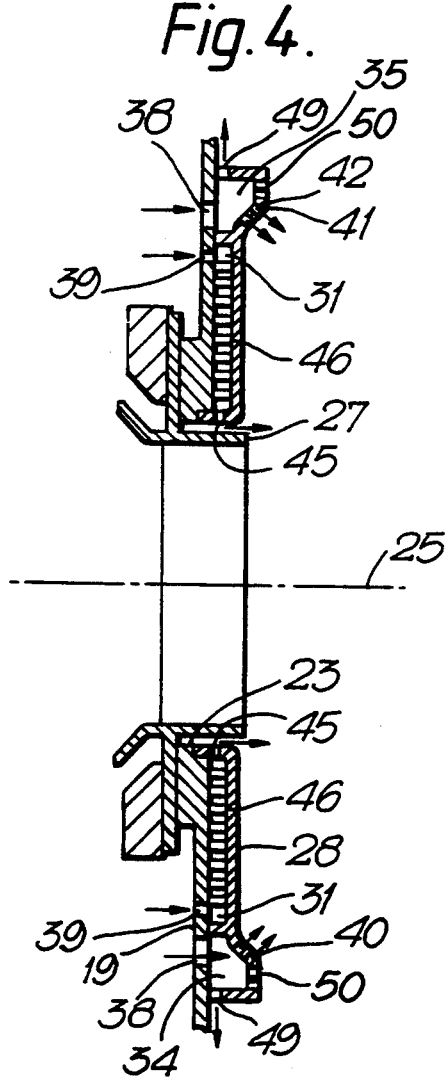
FIG. 4 is a view on section line B—B of FIG. 3.

Referring to FIG. 4, an annular seal 27 is interposed between each fuel burner 24 and its corresponding bulkhead aperture 23. The seals 27 are mounted so as to ensure that gas leakage between the fuel burners 24 and their apertures 23 is minimised while permitting a limited degree of radial movement between them to take account of problems created by thermal mis-matching.

The bulkhead 19 is particularly vulnerable to overheating resulting from the combustion process which takes place within the combustor 16. In order to provide thermal shielding of the bulkhead 19, a plurality of heat shields 28 are attached to the radially extending part of its downstream face. Four bolts 28a integral with each heat shield 28 facilitate that attachment.

Each heat shield 28 is provided with radially extending edges 29 which abut the corresponding edges 29 of adjacent heat shields 28. The heat shields 28 therefore cooperate to define a fully annular shield.

Each heat shield 28 is associated with a corresponding fuel burner aperture 23 and is itself provided with a similar fuel burner aperture 30. As can be seen in FIG. 4, the bulkhead and heat shield apertures 23 and 40 respectively are coaxially aligned to accommodate the seals 27 and in turn the fuel burners 24.

The heat shields 28 are all of similar construction. Consequently they will be described with reference to a single heat shield 28.

The upstream face of the heat shield 28 is spaced apart from the mid-portion of the downstream face of the bulkhead 19 so that a chamber 31 is defined between them, The spacing apart of the bulkhead 19 and the heat shield 28, and the definition of the chamber 31 is provided by a number of flanges which are integrally formed on the upstream face of the heat shield 28. It will be appreciated however that some or all of the flanges could alternatively be formed on the downstream face of the bulkhead 19 if so desired.

Figure 5:
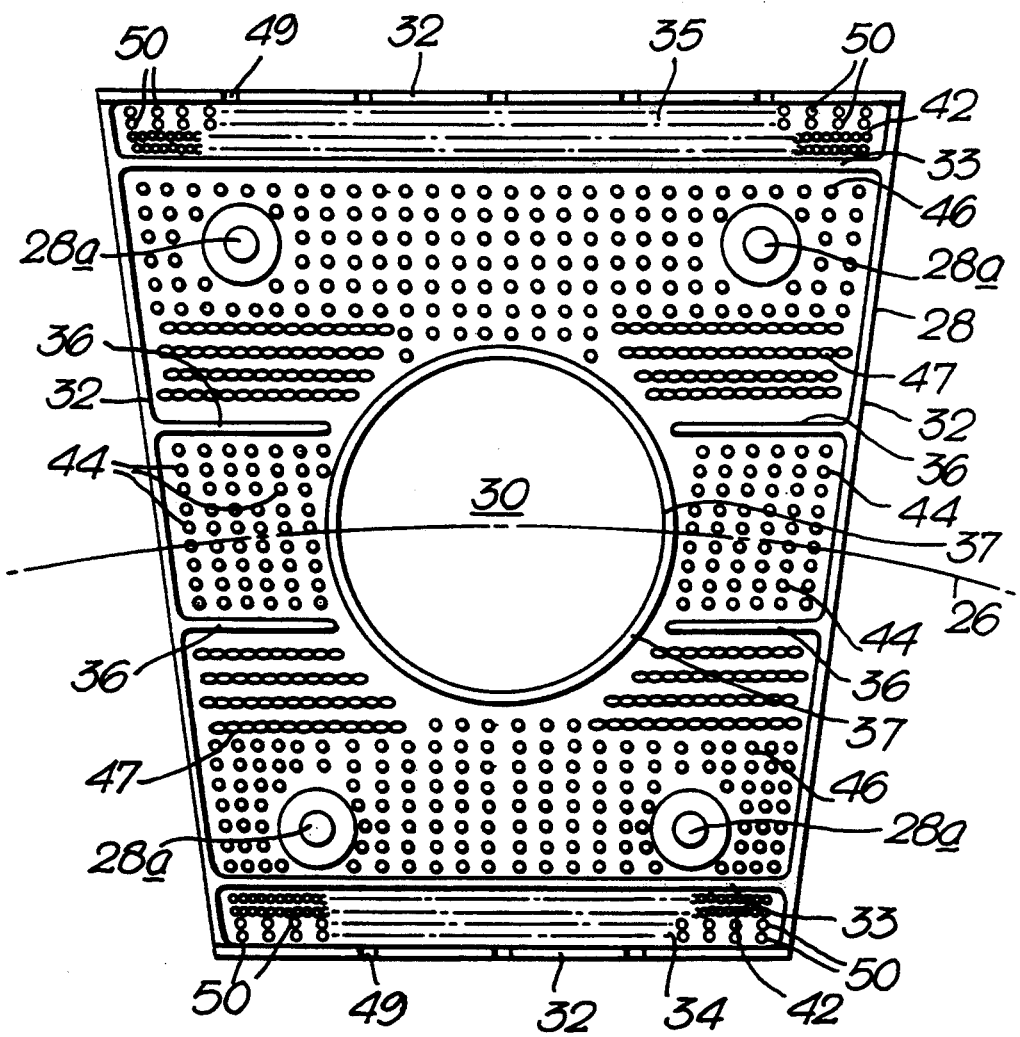
FIG. 5 is a view of the upstream face of the heat shield shown in FIG. 3.

Specifically, referring to FIG. 5, the heat shield 28 is provided with a flange 32 which extends around its outer periphery as well as flanges 33 which cooperate with the flange to define circumferentially extending compartments 34 and 35 within the chamber 31 at the radially inner and outer extents respectively of the heat shield 28. The remainder of the chamber 31 is subdivided by four flanges 36 which extend circumferentially from the radially extending edges 29 of the heat shield 28 towards, but terminating short of a annular flange 37 provided around the fuel burner aperture 30.

Figure 6:
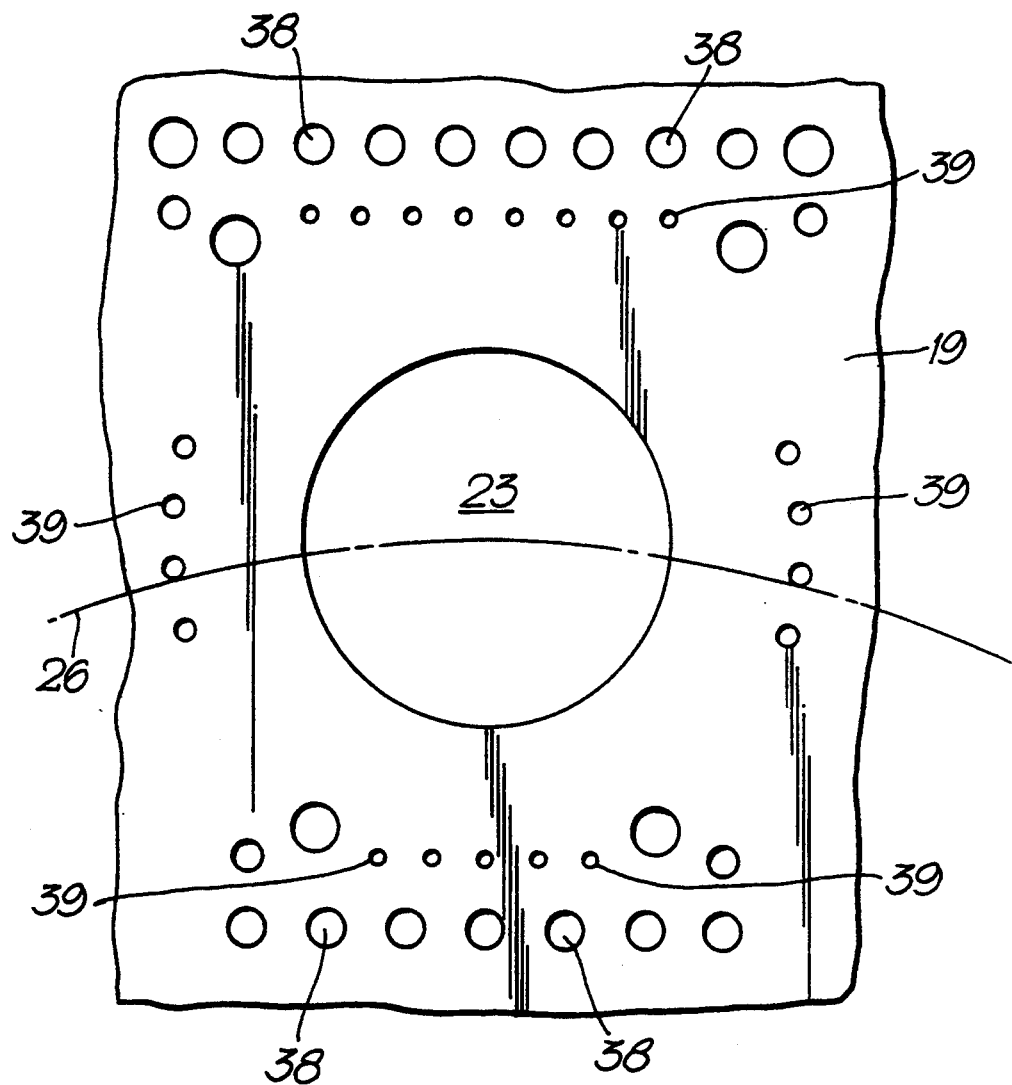
FIG. 6 is a view on arrow C of FIG. 2, the fuel burner and the seal therefor having been omitted in the interests of clarity.

Cooling air, which is part of the air flow from the air inlets 22, is directed into the chamber 31 through a plurality of apertures 38 and 39 in the bulkhead 19 as can be seen in FIG. 6. The apertures 38 are so positioned as to direct cooling air into the circumferentially extending compartments 34 and 35, whereas the apertures 39, which are of smaller diameter than the apertures 38, direct cooling air into the remaining part of the chamber 31. The cooling air passing through the apertures 38 and 39 impinges upon parts of the upstream face of the heat shield 28, thereby providing localised impingement cooling of those parts.

Figure 7:
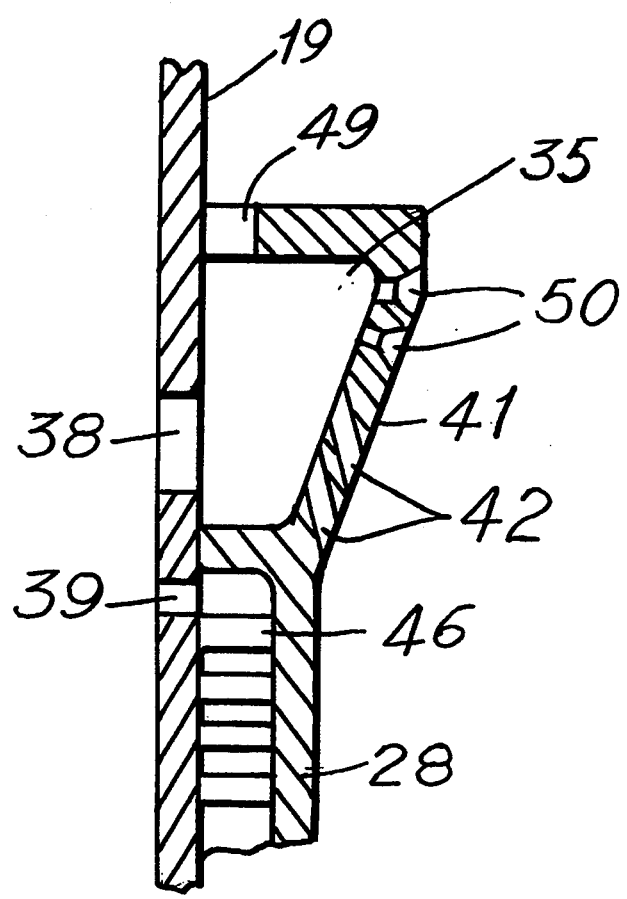
FIG. 7 is a view on an enlarged scale of a portion of FIG. 4.

The portions of the heat shields 28 which partially define the compartment 34 and 35 are, as can be seen in FIG. 4 of greater depth than the remainder of the heat shield 28. This is so as to facilitate the definition of facets 40 and 41 adjacent the radially inner and outer extents respectively of the heat shield 28. Both facets 40 and 41 face the notional surface 26 are provided with a large number of small apertures 42 which can be seen more clearly in FIG. 7 through which some of the cooling air from the compartments is exhausted. The facets are so angled with respect to the remainder of the heat shield 28 that the cooling air exhausted from the apertures 42 flows generally over the downstream face of the heat shield 19, thereby providing a certain degree of cooling of that downstream face.

Additional apertures 50 are provided in the heat shield 28 portions intermediate the facets 40 and 41 and the radially inner and outer extents of the heat shield 28. Specifically two circumferentially extending rows of the additional apertures 50 are located at each of the radially inner and outer extents of the heat shield, each row extending between the heat shield radially extending edges 29.

The axes of the additional apertures 50 are each inclined with respect to the heat shield 28. Specifically the axes are so inclined that cooling air exhausted through the additional apertures 50 is so exhausted in a common generally circumferentially extending direction. Some of the cooling air apertures are located in an array adjacent the radially outer extents of the heat shields and are substantially uniformly spaced in a continuous manner about the circumference of the combustor with each array being without any discontinuities in a circumferential direction. The cooling air flows through the additional apertures 50 of all of the heat shields 28 merge to define two substantially continuous annular flows of cooling air about the combustor longitudinal axis and across the downstream faces of the heat shields. One annular flow is adjacent the radially outer extents of the heat shields 28 and the outer adjacent the radially inner heat shield 28 extents.

These annular flows of cooling air ensure that there is cooling of the heat shield 28 regions adjacent their radially extending edges 29.

The heat shield 28 regions cooled by the annular flows of cooling air are those which are normally prone to overheating. It will be appreciated however that appropriately positioned apertures could be provided elsewhere in the heat shields 28 to provide additional or alternative circumferential cooling air flows if so desired.

Additional cooling apertures 49 are provided in the flange 32 portions on the radially inner and outer edge of the heat shield 28. Cooling air exhausted from the apertures 49 provides cooling of the radially inner and outer extents 20 and 21 respectively of the bulkhead 19.

The cooling air apertures 39 are so located in the bulkhead 19 as to direct cooling air into those regions of the chamber 31 which are adjacent the outer edges of the heat shield 28. The cooling air which enters the chamber 31 through the cooling air apertures 39 adjacent the radially extending edges 29 of the heat shield 28 then flows generally towards the radial plane 43 which contains the longitudinal axis 25 of the fuel burner aperture 30. The cooling air is constrained to flow in this direction by the four flanges 36. Pedestals 44 provided on the upstream face of the heat shield 28 between the flanges 36 ensure that an effective heat exchange relationship is established between the cooling air flow and the heat shield 28.

The annular flange 27 around the fuel injector aperture 30 is provided with apertures 45 around its total extent. The majority of the cooling air constrained by the flanges 36 is exhausted from the chamber 31 through some of the apertures 45 to impinge upon the seal 27 from which the flange 37 is radially spaced apart. Consequently the cooling air through the apertures 39 adjacent the radially extending edges 29 of the heat shield 28 provides both convective cooling of part of the heat shield 28 and impingement cooling of part of the seal 27. The cooling air then flows into the combustor 18 where it participates in the combustion process taking place therein.

The cooling air which enters the chamber 31 through the apertures adjacent the radially inner and outer edges of the heat shield 28 is constrained by the flanges 32 to flow generally the notional cylindrical surface 26. The cooling air flows over further pedestals 46 which are provided on the upstream face of the heat shield 28, again ensuring a good heat exchange relationship between the cooling air and the heat shield 28.

After flowing over the pedestals 46, some of the cooling air passes through the remaining apertures 45 in the circular flange 37 to impingement cool the seal 27. The remainder of the cooling air is exhausted from the chamber 31 through a plurality of film cooling holes 47 in the heat shield 28 which are located intermediate the four flanges 36 and the further pedestals 46. The cooling air exhausted from the film cooling holes 47 then proceeds to flow over the downstream face of the heat shield 28 generally towards the notional cylindrical surface 26 so as to provide film cooling of that face and subsequently take part in the combustion process taking place within the combustor 18.

It will be seen therefore that each of the heat shields 28 is extensively cooled by impingement cooling, convection cooling and by film cooling. Moreover the cooling air within the chamber 31 flows generally towards the fuel burner 24 so that the portions of the heat shields 28 which are closest to the fuel burners 24 and are usually the most difficult to cool are in fact cooled effectively.

A further advantage is that the films of cooling air which are exhausted from the film cooling holes 47 tend to drive desirable recirculation within the primary upstream combustion zone within the combustor 18.

Accordingly very effective use of cooling air is made in that the same air is used in turn for impingement cooling and convection cooling of the heat shield 28 and either film cooling of the heat shield 28 or impingement cooling of the seal 37. The heat shields 28 therefore provide effective thermal protection of the bulkhead 19.

It may be desirable under certain circumstances to avoid film cooling of some of the downstream faces of each of the heat shields 28 by the exhaustion of cooling air through the film cooling holes 47. Under these circumstances the cooling holes 47 could be deleted and the positions of the flanges 32 formerly adjacent the film cooling holes 47 also deleted together with part of the heat shield 28 in that area. Some of the cooling air from the chambers 31 would then, after flowing generally towards the notional cylindrical surface, be exhausted through gaps defined between circumferentially adjacent heat shields.

I claim:

1. A gas turbine engine annular combustor including a bulkhead at its upstream end, said bulkhead having a plurality of fuel burner receiving apertures therein, a plurality of heat shields, said heat shields being located on the downstream face of said bulkhead so as to provide thermal shielding of said bulkhead, said heat shields being arranged in an annular array, means being provided to space apart each of said heat shields and said bulkhead so that corresponding chambers are defined therebetween and including, for each said heat shield, a plurality of bolts extending from the upstream face thereof for attachment to the bulkhead of the combustor, said bolts each being spaced from an adjacent edge of each respective heat shield, said bulkhead having a plurality of further apertures therein to direct cooling air into said chambers, each of said heat shields having a plurality of cooling air apertures therein which are adapted to exhaust cooling air from its associated chamber, at least some of said cooling air apertures being located in an array adjacent the radially outer extents of each of said heat shields and being substantially uniformly spaced in a continuous manner about the circumference of said combustor, the array being without any discontinuities in said array in a circumferential direction, each of said at least some of said apertures having an axis inclined to exhaust cooling air in a common generally circumferential direction so that said cooling air flows from said at least some of said cooling air apertures merge to define at least one substantially continuous annular flow of cooling air about the longitudinal axis of said combustor and circumferentially across the downstream faces of said heat shields 2. A gas turbine engine annular combustor as claimed in claim 1 wherein said combustor has a plurality of circumferentially extending rows of cooling air apertures and at least one of said circumferentially extending rows of cooling air apertures is located adjacent the radially inner extents of each of said heat shields.

* * * * *